United States Patent [19]

Neefe

[11] Patent Number: 4,457,880

[45] Date of Patent: Jul. 3, 1984

[54] METHOD OF MAKING CONTACT LENS BLANKS

[76] Inventor: Charles W. Neefe, 811 Scurry St., P.O. Box 429, Big Spring, Tex. 79720

[21] Appl. No.: 466,527

[22] Filed: Feb. 15, 1983

[51] Int. Cl.³ .............................................. B29D 11/00
[52] U.S. Cl. .................................... 264/1.4; 264/2.3; 264/2.7; 264/39; 425/174.2; 425/808
[58] Field of Search ................... 264/1.4, 2.2, 2.3, 39; 425/808

[56] References Cited

U.S. PATENT DOCUMENTS 2,890,486 6/1959 Crandon .............................. 425/808
3,361,858 1/1968 Wichterle .............................. 264/2.2
4,155,962 5/1979 Neefe .................................. 425/808
4,159,292 6/1979 Neefe .................................. 264/1.4
4,197,266 4/1980 Clark .................................. 264/2.3
4,209,289 6/1980 Newcomb ............................ 264/2.2

*Primary Examiner*—James B. Lowe

[57] ABSTRACT

A lens blank having a finished optical surface is cast from a liquid monomer beneath an optical surfaced mold made from a resinous material which adheres to the polymerized lens material. The lower mold having a non-optical surface is made from a resinous material which will not adhere to the polymerized solid lens material. Ultra sonic vibrations are used to dislodge and clean particulate matter from the optical mold before polymerization of the liquid lens monomer.

4 Claims, 5 Drawing Figures

METHOD OF MAKING CONTACT LENS BLANKS

Plastic lenses offer many advantages over glass lenses. They are much lighter in weight and resist breakage. The cost of making high quality cast lenses has been high, due to the problems caused by the shrinkage of the monomer when polymerized.

Several methods have been developed in an attempt to overcome this shrinkage. The presently used process requires a flexible precision gasket, which cannot be reused. A new flexible precision gasket is required for each lens produced. A fixed holding pressure of small degree is applied to the mold in order to support the flexible precision gasket. This is expensive and produces lenses of medium quality.

FIELD OF THE INVENTION

The use of plastic materials for making optical lenses has increased rapidly for the past ten years. This is due to the availability of better plastic materials and the physical advantages of the plastic resins for specific application such as ophthalmic lenses. The technology for the production of high quality plastic lenses has not kept pace with the material supply industry. It is important to advance both areas if the full potential is to be realized.

Plastic lenses offer many advantages over glass lenses. They are much lighter in weight and resist breakage. The cost of making high quality lenses has been high, due to the problems caused by the shrinkage of the monomer when polymerized, which often breaks the expensive molds.

The current lens molds are fabricated from steel or glass, each mold is individually ground and polished to the required specifications. To achieve accurate reproduction of the bifocal and lenticular molds is most difficult and expensive. This new process makes possible exact reproductions and has many other distinct advantages which will become apparent from the following disclosure.

An object is to provide a process for making inexpensive molds which may be made to identical specifications.

Another object is to provide a process whereby standard masters may be used to produce a large quantity of replica molds.

Another object of the invention is to eliminate rejects caused by foreign particulate matter in the lens. Another object is to decrease the time required to fabricate the lens.

PRIOR ART

There have been several attempts, in the prior art, to mold contact lens blanks. As shown in the following U.S. Pat. Nos. 3,380,718, 4,008,031, 4,155,962 and 2,473,588. These are methods applied to solve the problems encountered in casting contact lens blanks with a finished optical surface.

SUMMARY OF THE INVENTION

An apparatus and method is disclosed for producing a finished optical blank which may be used for contact lenses, or the like. The invented apparatus and process is particularly adaptable for lenses which are thinner in the center, such as a concave (minus or negative) lens, including single vision, multifocal aspheric and cylinderical lenses.

The method employs a resinous convex mold which is lowered into a pool of lens monomer. In this way any foreign particulate matter will not settle on the optical surface. Many rejects have resulted from foreign matter being present on or near the cast optical surface. This problem has been eliminated by placing the optical surface above the non-optical surface. All foreign particulate matter observed in reject lenses has been heavier than the monomer, that is having a specific gravity greater than the liquid monomer. After the optical mold is placed in the liquid monomer, ultrasonic energy may be applied to the optical mold to dislodge and set free particulate matter and allowing it to settle away from the optical surface. Foreign matter present on the non-optical surface will be machined away in making the lens to desired thickness. The method also provides a resinous optical surface mold selected from those resins to which the lens monomer will adhere after polymerization, thereby preventing the lens material from separating from the optical surface mold. The opposing non-optical surface mold is made from a resinous material selected from those resins not adhering to the lens monomer when polymerized. Lens blank separation from the mold due to monomer shrinkage during polymerization will occur only at the non-optical surface of the lens blank leaving the optical surface in contact with the optical surface resinous mold. The finished lens blank is then forcibly removed from the optical lens mold.

THE LENS BLANKS ARE MADE AS FOLLOWS

Figure 2:
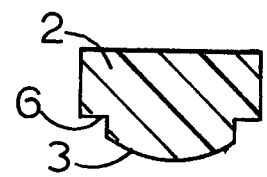
FIG. 2 shows the optical mold in section.
Figure 4:
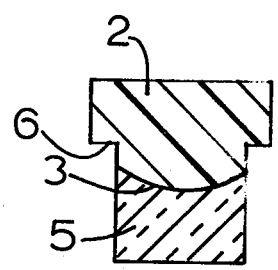
FIG. 4 shows the lens blank on the optical mold in section.

A resinous mold 2 FIG. 2 having a convex optical surface 3 FIG. 2 with a selected radius of curvature is made from a selected resin which adheres to the polymerized lens monomer 5 FIG. 4. Examples of adhering resins are: polyimides, acrylics, styrene and polycarbonate.

Figure 3:
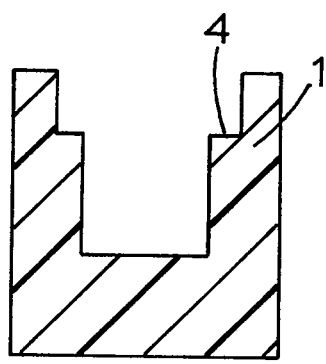
FIG. 3 shows the non-optical mold in section.

A resinous mold designed to provide the desired shape on the blanks 1 FIG. 3 is made from a selected resin which will not adhere to the polymerized lens material.

Examples of non-adhering resins are: polyethylene, polypropylene and teflon. The optical lens molds 2 FIG. 2 are made by injection molding. The non-optical 1 FIG. 3 may be made by injection molding, machining or casting.

Figure 1:
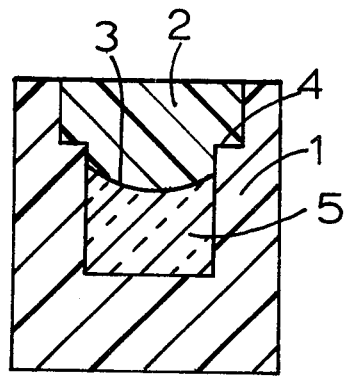
FIG. 1 shows the two molds placed together with the lens material in place between in section.
Figure 5:
FIG. 5 shows the finished lens blank in section.

Optical molds 2 FIG. 2 may be expendable and not reused due to cleaning and inspection costs and possibility of damaging the optical surface 3 FIG. 2 during cleaning. A shoulder 6 FIG. 2 controls the depth the optical mold 2 FIG. 1 goes into the blank mold 1 FIG. 1 and rests upon the mold support 4 FIG. 1 and FIG. 3 and controls the thickness of the blank 5 FIGS. 1, 4 and 5. The lens monomer 5 FIG. 1 may produce either a soft, hard or permeable lens. Examples of these monomers are hydroxyethylmethacrylate, methylmethacrylate or Gamma-Methacryloxypropyltrimethoxysilane, styrene and polyesters. The selected monomers usually a combination of several related monomers and a catalyst 5 FIG. 1 are placed in the mold 1 FIG. 1 and allowed to polymerize. And shrinkage occuring during polymerization will result in separation between the lens polymer 5 FIG. 1 and the non-adhering mold 1 FIG. 1. The polymerized solid lens material 5 FIG. 1 will remain attached to the adhering lens mold 2 FIG. 1 and the lens blank 5 FIG. 4 can be removed attached to the lens mold 2 FIG. 4. The finished lens blank 5 FIG. 5 is forcibly removed from the lens optical mold 2 FIG. 4. The lens blank 5 FIG. 5 has an optical surface 3 FIG. 5 which was produced by molding against the mold optical surface 3 FIG. 2.

It is understood that the second optical surface could be cut and polished before removing the blank 5 FIG. 4 from the optical surface mold 2 FIG. 4. The final lens diameter may also be cut by cutting the sides of the lens blank 5 FIG. 4 to the final lens diameter before removing from the optical lens mold 2 FIG. 4.

Various modifications, of course, can be made without departing from the spirit of this invention or the scope of the appended claims. It is understood that many variations are obtainable which will yield materials as disclosed herein. The constants set forth in this disclosure are given as examples and are in no way final or binding.

I claim:

1. A method of casting resinous lens blanks having a concave optical surface by the steps of providing a convex optical surface on a first resinous upper mold selected from the resinous materials which will adhere to the lens material when polymerized, providing a second lower non-optical concave mold from a selected resinous material which will not adhere to the polymerized solid lens material, placing a selected liquid lens monomer in the second concave mold, placing the first convex optical surfaced lens mold within the second concave mold to a predetermined location, displacing the liquid lens monomer around the first convex optical mold, applying ultrasonic vibrations to the upper convex optical mold to dislodge and set free particulate matter present on the convex optical surface, allowing the liquid lens monomer to polymerize forming a solid lens blank adhering to the first convex optical surfaced resinous mold and releasing from the concave non-optical resinous mold, removing the solid resinous lens blank from the second non-optical concave mold while attached to the first convex optical surfaced mold, forcibly removing the lens blank from the first convex optical surfaced mold.

2. The method of claim 1 wherein a convex optical surface is cut on the lens blank before forcibly removing the blank from the mold.

3. A method of casting resinous lens blanks having a concave optical surface by the steps of providing a convex optical surface on a first resinous upper mold selected from the resinous materials which will adhere to the lens material when polymerized, providing a second lower non-optical concave mold from a selected resinous material which will not adhere to the polymerized solid lens material, placing a selected liquid lens monomer in the second concave mold, placing the first convex optical surfaced mold within the second concave mold to a predetermined location, displacing the liquid lens monomer around the first convex optical mold, allowing the molds and liquid lens monomer to remain quiescent until particulate matter present in the liquid lens monomer migrates away from the upper optical surfaced mold, allowing the liquid lens monomer to polymerize forming a solid lens blank adhering to the first convex optical surfaced resinous mold and releasing from the concave non-optical resinous mold, removing the solid resinous lens blank from the second non-optical concave mold while attached to the first convex optical surfaced mold, forcibly removing the lens blank from the first convex optical surfaced mold.

4. The method of claim 3 wherein a convex optical surface is cut on the lens blank before forcibly removing the blank from the mold.

* * * * *